(12) United States Patent
Summerfield et al.

(10) Patent No.: US 8,775,187 B2
(45) Date of Patent: Jul. 8, 2014

(54) VOICE AUTHENTICATION SYSTEM AND METHODS

(75) Inventors: Clive Summerfield, Dickson (AU); Habib E. Talhami, Epping (AU)

(73) Assignee: Auraya Pty Ltd, Sydney (AU)

( * ) Notice: Subject to any disclaimer, the term of this patent is extended or adjusted under 35 U.S.C. 154(b) by 684 days.

(21) Appl. No.: 13/062,485

(22) PCT Filed: Sep. 7, 2009

(86) PCT No.: PCT/AU2009/001165
§ 371 (c)(1),
(2), (4) Date: May 23, 2011

(87) PCT Pub. No.: WO2010/025523
PCT Pub. Date: Mar. 11, 2010

(65) Prior Publication Data
US 2011/0213615 A1    Sep. 1, 2011

(30) Foreign Application Priority Data
Sep. 5, 2008 (AU) ................................ 2008904631

(51) Int. Cl.
*G10L 17/00* (2013.01)
(52) U.S. Cl.
USPC ........................................................ 704/273
(58) Field of Classification Search
USPC ........................................ 704/246–250, 273
See application file for complete search history.

(56) References Cited

U.S. PATENT DOCUMENTS

| | | | |
|---|---|---|---|
| 4,761,807 A | | 8/1988 | Matthews et al. |
| 7,092,553 B2 * | | 8/2006 | Kuepper et al. ............... 382/116 |
| 7,278,028 B1 * | | 10/2007 | Hingoranee .................. 713/186 |
| 7,404,087 B2 * | | 7/2008 | Teunen ......................... 713/186 |
| 8,332,223 B2 * | | 12/2012 | Farrell et al. .................. 704/246 |
| 8,401,245 B2 * | | 3/2013 | Hashimoto .................. 382/115 |
| 2005/0041783 A1 | | 2/2005 | Timmins et al. |
| 2007/0038868 A1 | | 2/2007 | Yu et al. |
| 2007/0219801 A1 * | | 9/2007 | Sundaram et al. ............ 704/270 |

FOREIGN PATENT DOCUMENTS

| WO | WO-03098373 A2 | 11/2003 |
|---|---|---|
| WO | WO-2007098039 A1 | 8/2007 |

OTHER PUBLICATIONS

Campbell Jr., J.P. "Speaker Recognition: A Tutorial" In: Proceeding of the IEEE, Sep. 1997, vol. 85, No. 9, pp. 1437-1462, p. 1455 col. 1 lines 1-55; p. 1456, col. 2 lines 11-28.

Reynolds, D.A. "An Overview of Automatic Speaker Recognition Technology", In: IEEE, International Conference on Acoustics, Speech and Signal Processing, 2002, vol. 4, pp. IV-4072-IV-4075, p. iv-4073, col. 2 line 52-p. iv-4074 col. 1, line 10; p. iv-4074, col. 1 lines 45-49.

\* cited by examiner

*Primary Examiner* — Abul Azad
(74) *Attorney, Agent, or Firm* — Blank Rome LLP

(57) ABSTRACT

A method for configuring a voice authentication system comprises ascertaining a measure of confidence associated with a voice sample enrolled with the authentication system. The measure of confidence is derived through simulated impostor testing carried out on the enrolled sample.

26 Claims, 13 Drawing Sheets

| ID | Item | EER | Threshold 1 | Threshold 2 | Score | Diagnostics Summary |
|---|---|---|---|---|---|---|
| 463035 | 1 | 0 | 49.49 | 44.77 | 78.78 | Verified |
| 463035 | 0 | 0 | 48.56 | 43.94 | 67.13 | Verified |
| 463030 | 1 | 0 | 60.90 | 55.10 | 100.00 | Verified |
| 463030 | 0 | 0 | 66.08 | 59.78 | 97.18 | Verified |
| 463031 | 1 | 0 | 61.56 | 55.70 | 93.15 | Verified |
| 463031 | 0 | 0 | 61.75 | 55.87 | 88.21 | Verified |

VOICE AUTHENTICATION SYSTEM AND METHODS

REFERENCE TO RELATED APPLICATION

The present application is a National Stage of International Patent Application No. PCT/AU2009/001165, filed Sep. 7, 2009, published in English on Mar. 11, 2010, as WO 2010/025523 A1, whose disclosure is hereby incorporated by reference in its entirety into the present disclosure.

FIELD OF THE INVENTION

The present invention relates generally to a voice authentication system and methods.

BACKGROUND OF THE INVENTION

Voice authentication systems are becoming increasingly popular for providing access control. For example, voice authentication systems are currently being utilised in telephone banking systems, automated proof of identity applications in call centres systems, automatic teller machines, building and office entry access systems, automated password reset, call back verification for highly secure internet transactions, etc.

Voice authentication is typically conducted over a telecommunications network, as a two stage process. The first stage, referred to as the enrolment stage, involves processing a sample of a person's voice presented to a voice authentication engine to generate an acoustic model or "voiceprint" that represents their unique voice characteristics. The second stage, or authentication stage, involves receiving a voice sample of a person to be authenticated (or identified) over the network. Again, the voice authentication engine generates an acoustic model of the sample and compares this with the stored voiceprint to derive an authentication score indicating how closely matched the two samples are (and therefore the likelihood that the person is, in fact, the same as that being claimed). This score is typically expressed as a numerical value and involves various mathematical calculations that can vary from engine to engine.

In the case of the correct, or "legitimate", person accessing the authentication system, the expectation is that their voiceprint (i.e. generated from their voice file) will closely match the voiceprint previously created for that person, resulting in a high score. If a fraudster (often referred to in the art as an "impostor") is attempting to access the system using the legitimate person's information (e.g. speaking their account number, password, etc), the expectation is that the impostor's voiceprint will not closely match the legitimate person's voiceprint, thus resulting in a low score even though the impostor is quoting the correct information.

Whether a person is subsequently deemed to be legitimate is typically dependent on a threshold set by the authentication system. To be granted access to the system, the score generated by the authentication system needs to exceed the threshold. If the threshold score is set too high then there is a risk of rejecting large numbers of legitimate persons. This is known as the false rejection rate (FRR). On the other hand, if the threshold is set too low there is a greater risk of allowing access to impostors. This is known as the false acceptance rate (FAR).

As one would appreciate, therefore, selecting an appropriate threshold for an authentication system can be difficult to achieve. On one hand the threshold setting needs to be high enough that business security requirements of the secure services utilising the authentication system are met. However, such settings can cause undue service issues with too many legitimate persons being rejected. Similarly, if the threshold is set too low, while achieving good services levels, security may be put at risk. The problem of selecting appropriate threshold settings is compounded by the fact that different authentication engines utilise different attributes or characteristics for voiceprint comparison and as a result may produce a wide range of different scores based on the same type of content provided in the voice samples (e.g. number, phrases, etc.). What is more, a single engine will also produce quite different scores for voice samples of different content types, for example an account number compared to a date of birth, or a phrase.

DEFINITIONS

"Voice Sample" is used herein to denote a sample of a person's voice.

"Voice file" is the storage of a voice sample as a data file.

"Voiceprint" is an acoustic model of a person's voice characteristics (i.e. an acoustic model). Voiceprints are generated from voice samples/files and may be processed by a voice authentication engine to generate probability scores as to how closely the characteristics of an associated speaker match those of another speaker.

"Content Type"—refers to the type of content being provided in the voice sample. For example, the content may be a spoken account number or password. Other content types can include but are not limited to an answer to a question; an unconstrained passage of speech as spoken by a caller to a call centre agent; or a standard phrase (e.g. "At ABC bank, my voice is my password"). In an embodiment, content type can also refer to the type of input device being used to provide the sample (e.g. mobile phone, landline, etc.).

"Impostor" is used herein to refer to a person that is known to the system but is not the "legitimate speaker" under test. The term "impostor" is also used as a technical term used in this document to describe the behaviour of a fraudster or an identity thief that is using a legitimate speaker's content information (e.g. spoken account number and password) in an attempt to gain access to that person's secure services.

"Threshold" refers to a base setting against which an authentication score is compared for determining whether to accept or reject that speakers claimed identity. If the score exceeds the threshold, the person will typically be accepted. If the score is below the threshold, the authentication system typically rejects the person. Multiple thresholds may be utilised associated with different levels of assurance.

"Business Rule" is used herein to refer to one or more risk parameters determined by a secure service associated with allowing customers access to different secure services. For example, a business rule may stipulate that a user only has to receive a moderate authentication score in order to gain access to their account for performing standard transactions (e.g. to pay their electricity bill), but would need to be authenticated to a much higher level of certainty (i.e. produce a high authentication score) to perform high cost high risk transactions such as accessing overseas accounts, etc.

"False-Accept Rate" (FAR) is a measure of the rate at which impostors are incorrectly accepted as a legitimate speaker by an authentication system. In one embodiment, the FAR may be defined as: the number of impostors accepted divided by the total number of speakers tested.

"False-Reject Rate" (FRR) is a measure of the rate at which legitimate speakers are incorrectly rejected by the system. In one embodiment, the FRR may be defined as: the number of speakers rejected divided by the total number of speakers tested.

"Equal-Error Rate" (EER) is a characteristic resulting from a threshold setting of the system where the false-accept rate (FAR) equals the false-reject rate (FRR). The EER is used as a raw measure of how well an authentication system can separate legitimate speakers from impostor speakers. The lower the score, the better the technology is at performing this function. A 0% EER indicates that the authentication system has been able to separate all legitimate speakers from all the impostors.

"Failure To Acquire" (FTA) means that a particular voice file cannot be used to obtain a suitable verification result, e.g. the noise level is too high.

"Failure To Enroll" (FTE) means that a particular set of voice files cannot be used to compute a voiceprint, e.g. the amount of speech data is insufficient for enrollment.

"IVR" refers to an Interactive Voice Response (system).

"World Models" (also referred to as "Universal" or "Background Models") are speech models generated from a complete population of speakers and may be used in the authentication system to normalise the score generated by each individual speaker models.

SUMMARY OF THE INVENTION

In accordance with a first aspect, the present invention provides a method for configuring a voice authentication system, the method comprising the steps of: ascertaining a measure of confidence associated with a voice sample enrolled with the authentication system, the measure of confidence being derived through simulated impostor testing carried out on the enrolled sample.

Through extensive testing, the present inventors have discovered that not all voiceprints enrolled with an authentication system have the same security performance. That is, some voiceprints are more easily broken into by fraudsters than others (i.e. they are more vulnerable). In light of this discovery, embodiments of the present invention are operable to measure the performance of each individual voiceprint (i.e. by deriving individual confidence measures for each voice sample). In embodiment, the authentication system can then implement various optimisation actions to improve the performance of the voiceprint and thus the overall performance of the authentication system. For example, where an individual is known to have a weak or vulnerable voiceprint (i.e. one with low measure of confidence), then special procedures and rules can be applied to either strengthen the voiceprint or implement special procedures, such as asking additional questions or passing the caller to a call centre for special processing to strengthen the identity authentication process for those known to have weak voiceprints.

In an embodiment the method comprises the further step of implementing an optimisation action for the enrolled voice sample based, at least in part, on the ascertained measure of confidence.

In an embodiment the simulated impostor testing comprises utilising at least one authentication engine to compare at least one impostor voice sample against a voiceprint derived from the enrolled sample, to determine an individual false acceptance rate.

In an embodiment the individual false acceptance rate (IFAR) is utilised to derive the measure of confidence.

In an embodiment the method comprises the further step of determining an individual false rejection rate (IFRR) for the enrolled sample, such that the IFRR is additionally utilised to derive the measure of confidence.

In an embodiment the step of determining the IFRR comprises utilising an authentication engine to compare a legitimate voice sample (i.e. a sample provided by the same speaker to which the enrolled sample belongs) against a voiceprint derived from the enrolled voice sample, to output a score which can be processed to determine the IFRR.

In an embodiment the IFAR and IFRR are utilised to determined an individual equal error rate (IEER) associated with the enrolled voice sample.

In an embodiment the method comprises the further step of comparing the IEER with a reference setting to derive the measure of confidence.

In an embodiment the reference setting is a mean individual equal error rate for a plurality of other samples enrolled with the system.

In an embodiment a weak measure of confidence is assigned to the enrolled voice sample responsive to determining that the IEER is greater than the mean IEER.

In an embodiment, responsive to establishing that the enrolled voice sample is weak, the method comprises carrying out the optimisation action of re-building a voiceprint associated with the enrolled voice sample to adjust a speaker and/or environmental characteristic associated with the voiceprint.

In an embodiment, responsive to establishing that the enrolled voice sample is weak, the method comprises carrying out the optimisation action of re-building a world model from which the associated voiceprint was derived.

In an embodiment, responsive to establishing that the enrolled voice sample is weak, the method comprises carrying out the optimisation action of re-building the voiceprint.

In an embodiment the optimisation action comprises setting a threshold associated with the enrolled sample, based on the derived measure of confidence.

In an embodiment, upon determining that the measure of confidence does not meet a set threshold, the optimisation action comprises requesting that the voice sample be re-enrolled.

In an embodiment the optimisation step is repeated each time a new voice sample is enrolled with the system.

In an embodiment the optimisation action is carried out for enrolled voice samples until a threshold performance measure for the system has been met.

In an embodiment the threshold performance measure is associated with an overall equal error rate for the system.

In an embodiment the impostor samples have the same content type and/or speaker characteristic as the enrolled sample.

In an embodiment the impostor samples are samples provided by other legitimate persons during either enrolment with the system or during a subsequent authentication session.

In accordance with a second aspect, the present invention provides a method for configuring a voice authentication system, the method comprising the steps of:

ascertaining a measure of confidence associated with a voiceprint of a voice sample enrolled with the authentication system, the measure of confidence being derived through simulated impostor testing carried out on the enrolled sample.

In accordance with a third aspect, the present invention provides a voice authentication system comprising:

an ascertaining module operable to ascertain a measure of confidence associated with a voice sample enrolled with the authentication system, the measure of confidence being derived through simulated impostor testing carried out on the enrolled sample by an impostor testing module.

In an embodiment the system further comprises an optimisation module operable to implement an optimisation action for the enrolled voice sample based, at least in part, on the ascertained measure of confidence.

In an embodiment the impostor testing module compares at least one impostor voice sample against the enrolled sample, to determine an individual false acceptance rate.

In embodiment the impostor testing module comprises an authentication engine operable to compare the at least one impostor voice sample against a voiceprint derived from the enrolled sample, the resultant scores processed by the testing module to provide the individual false acceptance rate.

In an embodiment the individual false acceptance rate is utilised to derive the measure of confidence.

In an embodiment the impostor testing module is further arranged to determine an individual false rejection rate for the enrolled sample, the individual false rejection rate being additionally utilised to derive the measure of confidence.

In an embodiment the individual false rejection rate is determined utilising an authentication engine which is operable to compare a legitimate voice sample against a voiceprint derived from the enrolled voice sample to output a score which can be processed to determine the IFRR.

In an embodiment the individual false acceptance rate and individual false rejection rate are utilised to establish an individual equal error rate (IEER) for the enrolled voice sample.

In an embodiment the impostor testing module is operable to compare the IEER with a reference setting to derive the measure of confidence.

In an embodiment the reference setting is a mean individual equal error rate for a plurality of other samples enrolled with the system.

In an embodiment a weak measure of confidence is assigned to the enrolled voice sample responsive to determining that the IEER is greater than the mean IEER.

In an embodiment responsive to establishing that the enrolled voice sample is weak, the optimisation module re-builds a voiceprint associated with the enrolled voice sample to adjust a speaker and/or environmental characteristic associated with the voiceprint.

In an embodiment the optimisation module re-builds a world model from which the associated voiceprint was derived, responsive to establishing that the enrolled voice sample is weak.

In an embodiment the optimisation module sets an acceptance threshold associated with the enrolled sample, based on the derived measure of confidence.

In an embodiment the optimisation module requests that the voice sample be re-enrolled, upon determining that the measure of confidence does not meet a set threshold.

In an embodiment the optimisation action is carried out each time a new voice sample is enrolled with the system.

In an embodiment the optimisation module continues to carry out optimisation actions until a threshold performance measure for the system has been met.

In an embodiment the performance measure is associated with an overall equal error rate for the system.

In accordance with a fourth aspect the present invention provides a method for providing a secure service, comprising the steps of:
receiving data indicative of a measure of confidence associated with a user of the secure service, the measure of confidence being derived through simulated impostor testing carried out on an voice sample of the user; and
adjusting a level of authentication required by the user to access the secure service based, at least in part, on the measure of confidence.

In an embodiment the level of authentication is adjusted by setting an acceptance threshold level.

In an embodiment the simulated impostor testing is carried out using the methodology according to the first aspect.

In accordance with a fifth aspect the present invention provides a secure service provider system comprising:
a receiving module operable to receive data indicative of a measure of confidence associated with a user of the secure service, the measure of confidence being derived through simulated impostor testing carried out on a voice sample of the user; and
an adjustment module operable to adjust a level of authentication required by the user to access the secure service based, at least in part, on the measure of confidence.

In accordance with a sixth aspect the present invention provides a computer program comprising at least one instruction for controlling a computing system to implement a method in accordance with the first aspect.

In accordance with a seventh aspect the present invention provides a computer readable medium providing a computer program in accordance with the fourth aspect.

BRIEF DESCRIPTION OF THE DRAWINGS

Features and advantages of the present invention will become apparent from the following description of embodiments thereof, by way of example only, with reference to the accompanying drawings, in which:

FIG. 1b is a schematic of the individual modules implemented by the third party server of FIG. 1a;

FIG. 7 is a screen shot generated by a graphics rendering application, in accordance with an embodiment, showing different thresholds automatically set by the system per speaker and for speech samples with different content types;

FIG. 8 is a screen shot generated by a graphics rendering application, in accordance with an embodiment, showing the speaker information generated by the system;

DETAILED DESCRIPTION OF PREFERRED EMBODIMENTS

For the purposes of illustration, and with reference to the figures, embodiments of the invention will hereafter be described in the context of a voice authentication system for a secure service, such as a secure interactive voice response ("IVR") telephone banking service. In the illustrated embodiment, the authentication system is implemented as a third party system independent of the secure service. In the illustrated embodiment, the authentication system is implemented as a third party system independent of the secure service. It will be understood by persons skilled in the art, however, that both the secure service and authentication system may be integrated as a single service. Persons (hereafter "customers") communicate with the authentication system using an input device in the form of a fixed telephone (although it will be understood that a mobile telephone, VOIP pc-based telephone, or the like may equally be utilised for communicating with the authentication system).

Figure 1A:
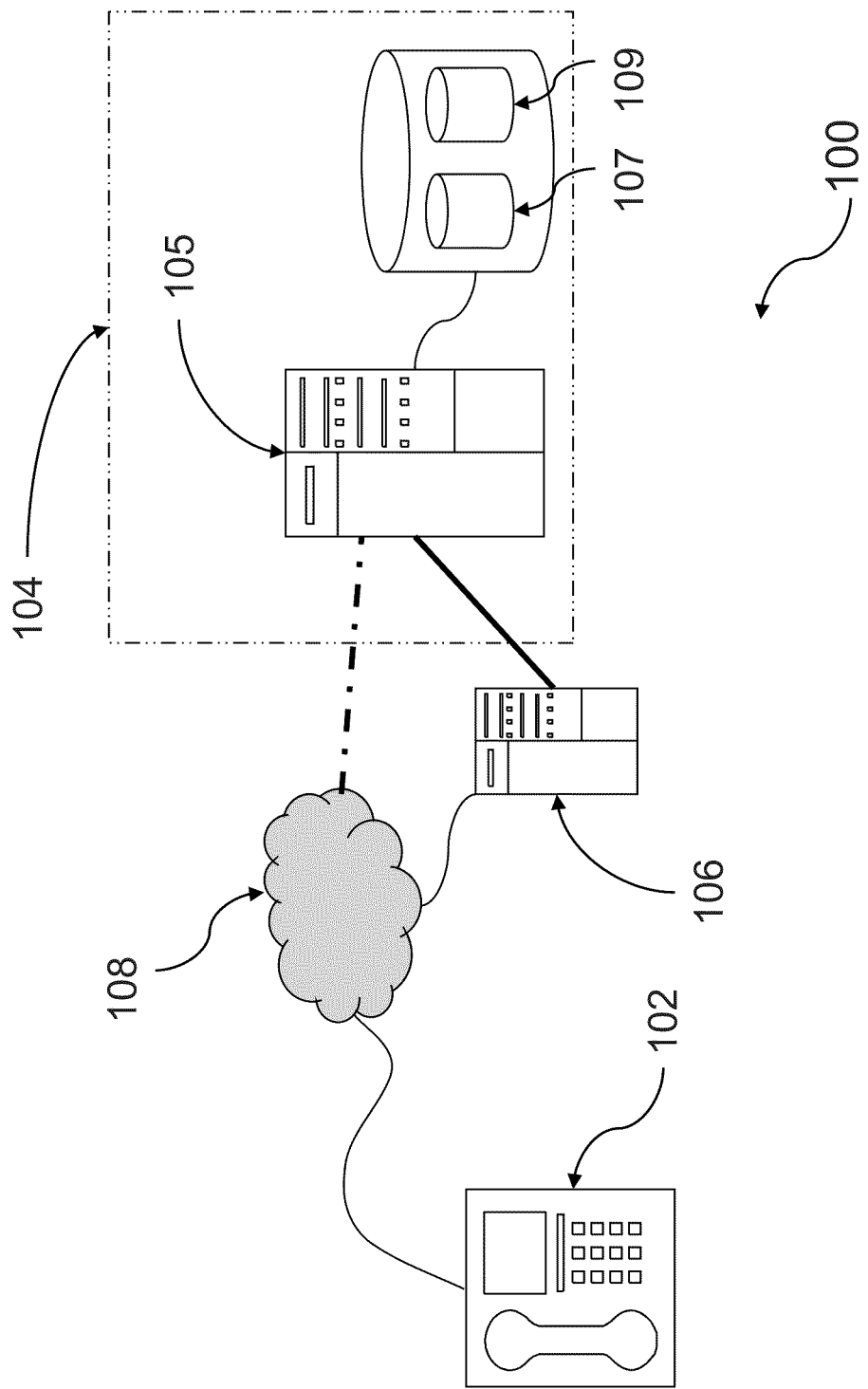
FIG. 1a is a block diagram of a system in accordance with an embodiment of the present invention.

FIG. 1a illustrates an example system configuration 100 for implementing an embodiment of the present invention. The system 100 includes a user input device 102 in the form of a standard telephone; third party authentication system 104 (hereafter "third party system"); secure service provider system 106 in the form of an Internet banking server hosting a secure customer banking web site; and communications system 108, in the form of a public-switched telephone network.

Figure 2:
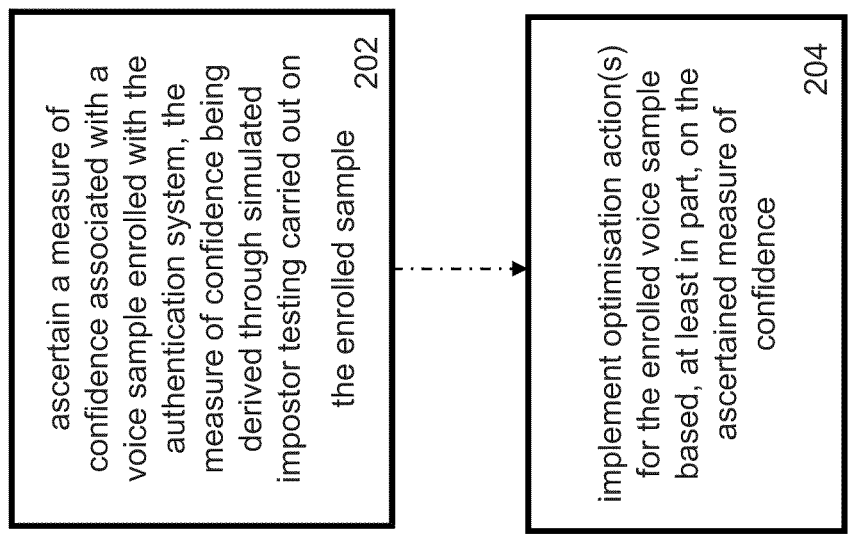
FIG. 2 is a basic process flow for carrying out an embodiment of the present invention.

With reference to FIG. 2 there is shown a flowchart illustrating method steps for implementing an embodiment of the present invention. Embodiments are operable to ascertain a measure of confidence associated with a voiceprint of a voice sample which has been enrolled with the third party system 104 (step 202). In an embodiment, once the measure of confidence has been derived, either the third party system 104 and/or secure service provider system 106 are operable to implement various optimisation actions based on the determined confidence measure (204). In an embodiment, the measure of confidence is determined by carrying out simulated impostor attacks on each enrolled voiceprint. Further, by comparing the individual measures against a baseline or reference confidence measure (e.g. such as an average confidence measure for the system, etc), voiceprints that have an increased susceptibility to a real impostor attack (i.e. "weak" voiceprints) can readily be determined. Optimisation actions can then be taken in order to increase the strength of the voiceprints and thus improve the overall system robustness.

The following description will first describe an example process for "enrolling" (i.e. initially storing voice samples with the system) and then go on to describe embodiments for determining the individual confidence measures and optimisation actions that can be taken to improve the performance and robustness of the third party system 104. In this description the word "customer" refers to a person speaking to the system over a communications network.

Initial Enrolment

Figure 3:
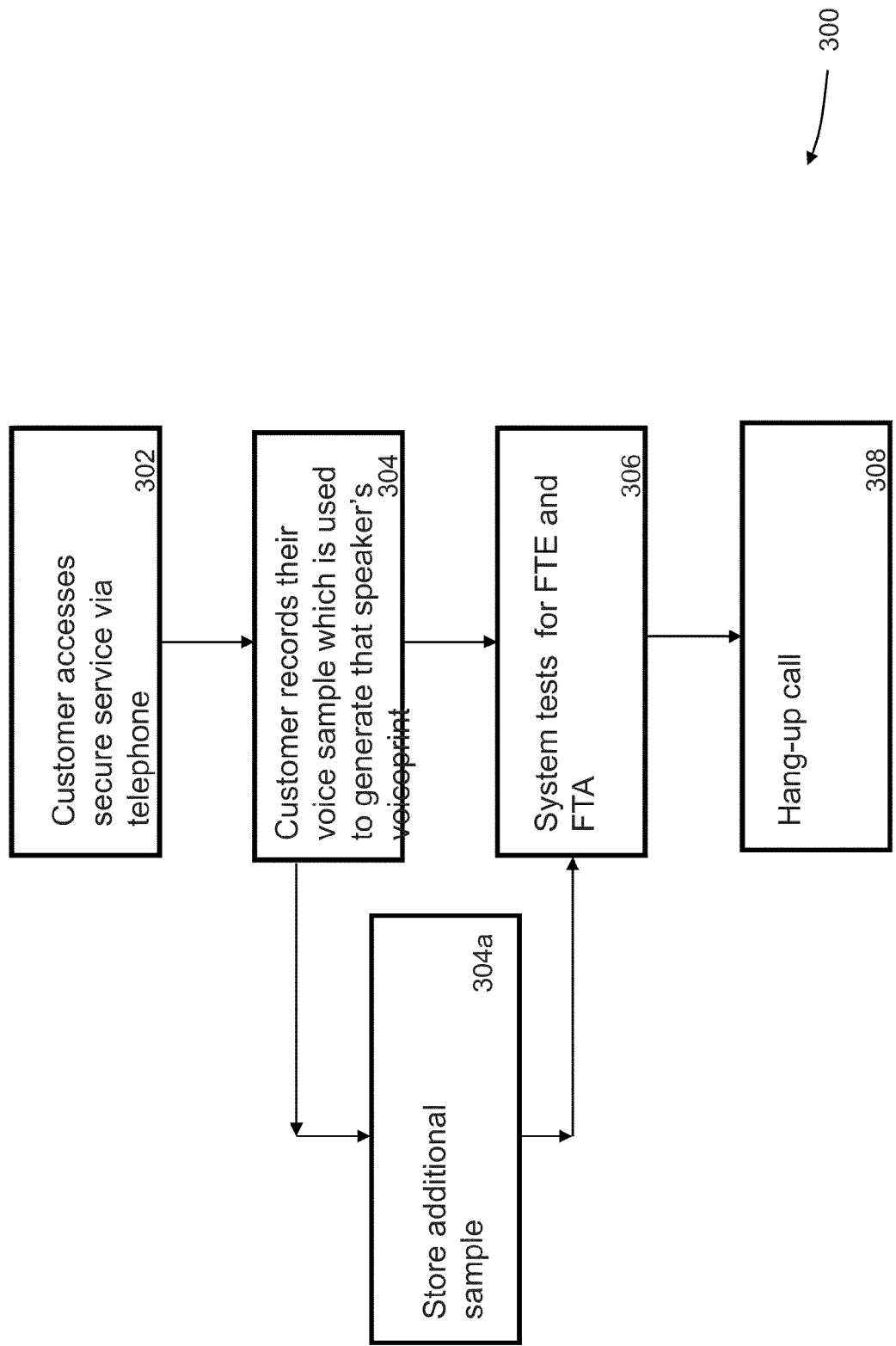
FIG. 3 is a flow diagram showing the method steps for enrolling, in accordance with an embodiment of the invention.

With additional reference to FIG. 3, at step 302 a customer dials a telephone banking number associated with the secure service 106. The third party system 104 answers the call and enrolment begins. This may involve requesting that the customer utter speech of a particular type of information (i.e. content type) such as, for example, their customer number, password, a common generic phrase, etc. The system 104 may ask the customer to repeat the utterance a number of times until the system 104 has sufficient samples to create a voiceprint.

According to the illustrated embodiment, a customer's voice sample is subsequently recorded as a voice file and processed to create the voiceprint (also referred to as speaker model). The voice file is stored in database 107, whilst the voiceprint is stored in voiceprint database 109 (step 304). The voiceprint is stored in association with a customer identifier; in this case their customer number recorded by the identity management database 111. In an embodiment the voiceprint is derived from one or more generic world or background models, using techniques known to persons skilled in the art. It will be understood that more than one voice sample (e.g. associated with different content types) may be recorded by each customer (step 304a). For example, the customer may provide separate samples for their account number, telephone number, name, pin number, phrase etc. In an embodiment, the customer may also be asked to answer a shared secret question or utter a standard phrase (such "At ABC bank, my voice is my password"). It will be understood that these phrases may be used not only to effectively build the authentication system, but also to strengthen security by providing additional authentication samples on which to base an authentication decision.

After the customer voiceprint(s) have been successfully "enrolled", the third party system 104 may test both the failure to enrol (FTE) and failure to acquire (FTA) characteristics, using techniques known to persons skilled in the art (step 306). These statistics are logged by the third party system 104. The process ends with the caller hanging up at step 308.

Impostor Files

Figure 1B:
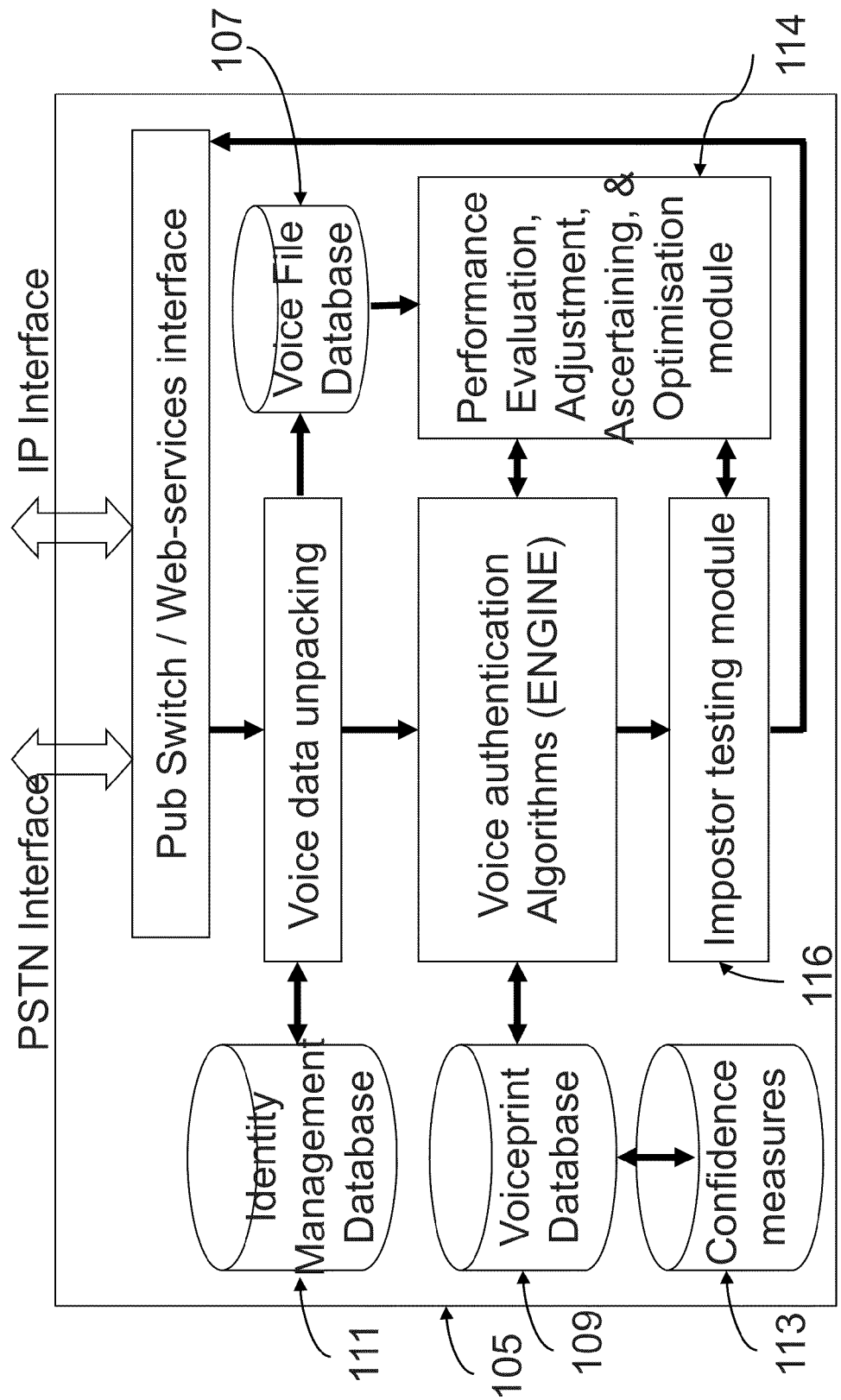

With additional reference to FIG. 1b, the third party system 104 is operable to retrieve files of other customers from the voice file database for use in the impostor testing process. The retrieved files may be tested against the selected voice file on the fly, or alternatively stored in an impostor database (not shown) for batch testing at some late time (e.g. during low usage times). In an embodiment, the voice files selected for impostor testing share the same content type as the file under test. For example, where the voice file under test is associated with a male speaker speaking account numbers; only male voice files saying account numbers will be utilised for impostor testing. In a further embodiment, the impostor files are selected from files that have been provided by other customers for an authentication session. In an embodiment, only files which have scored highly in those previous authentication sessions may be utilised for the impostor testing.

Where the authentication session utilises text dependent authentication engines, the impostor files may be processed (e.g. by segmenting and re-ordering) to generate the requisite content information for the customer file being tested. In other words, in an embodiment, in order to create impostor voice files, the voice files stored by the database 109 are processed to generate the requisite content information for the customer file being tested (i.e. the "legitimate" voice file). Alternatively, for text independent processing (or where a standard/generic phrase is used for authentication), the retrieved voice files can be used directly as impostor voice files.

The number of voice files selected for the simulated impostor testing will depend on the particular implementation. In other words, the third party system 104 may apply as many voice files as required to produce adequate coverage across the authentication system (i.e. to ensure that an accurate measure of the strength of individual voiceprints can be made and hence the measure of confidence associated therewith). Furthermore, the process of storing voice files in the database 109 may be on-going; that is, new voice samples successfully captured during enrolment or extracted from successful authentication sessions, may be stored in the database 109 for subsequent use in the impostor attacks and re-building of world models.

Determining Confidence Measures

As previously mentioned, the third party system 104 is operable to ascertain measures of confidence for each voiceprint so as to identify voiceprints that are weak and susceptible to impostor attack. Action may then be taken to improve security performance of those weak voiceprints.

Figure 4:
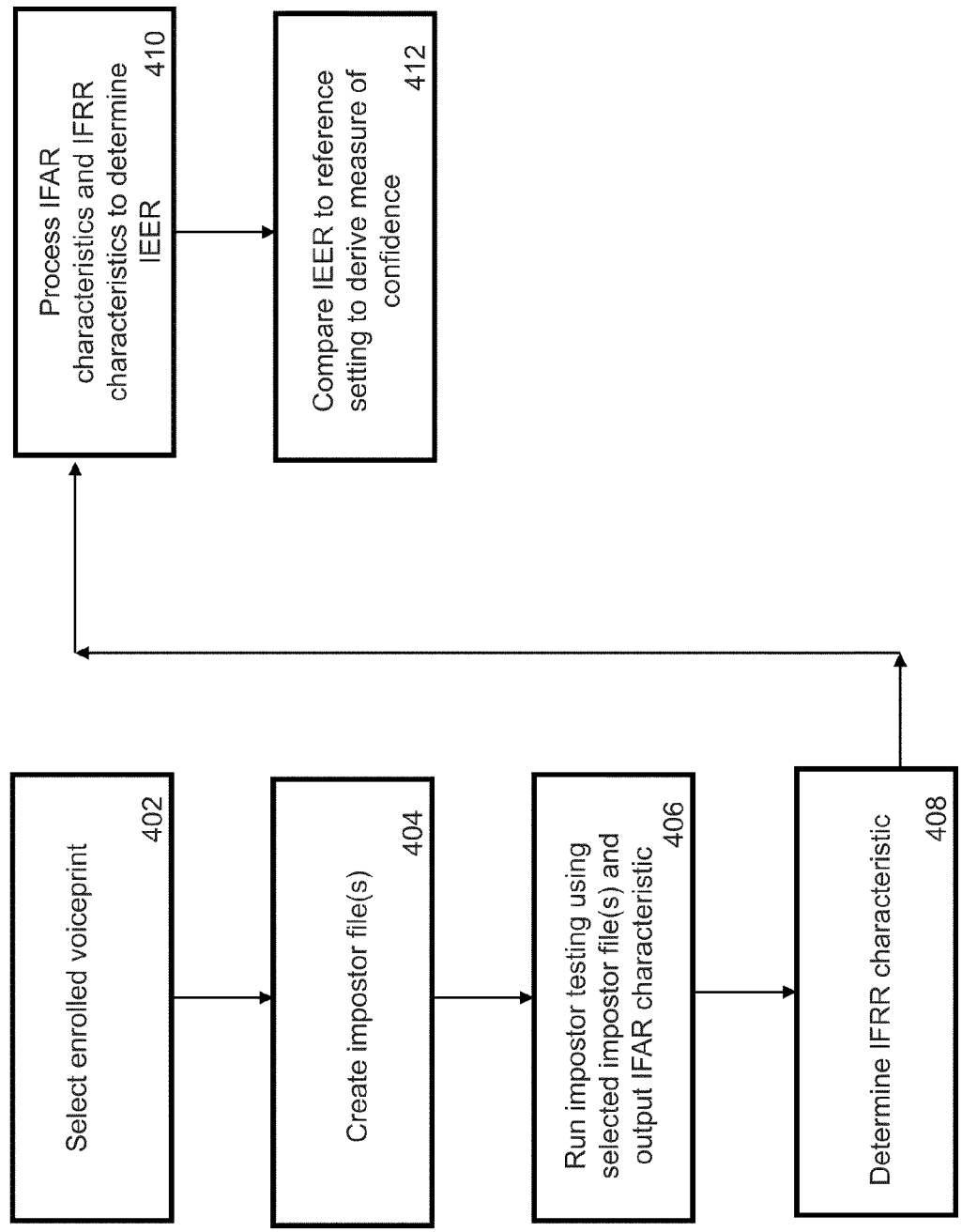
FIG. 4 is a flow diagram for deriving individual confidence measures.

With reference to FIG. 4, the first step in deriving the measure of confidence involves establishing how well the voiceprint performs in response to a simulated impostor attack. The simulated impostor attack process involves selecting a customer voiceprint that has been produced during enrolment (step 402). The selected customer voiceprint will hereafter be referred to as the "legitimate" speaker voiceprint. At step 404, one or more voice files of other known customers are retrieved from the voice file database 107 hereafter referred to as impostor voice files, using techniques previously described. The impostor voice files are then applied to the voice authentication engine and the resultant authentication scores produced by the engine when referencing the selected voiceprint are stored in association with the voiceprint under test (step 406).

As mentioned above, one technique for creating impostor voice file is to segment and re-order parts of other customer voice files to create a file having the same content information as was present in the sample from which the target voiceprint was derived. This process may involve, for example, passing the other customer files through a speech recognition engine configured to recognise the constituent parts of the files and segment into voice files accordingly. The process then continues by re-ordering the constituent parts to form the same spoken content as was present in the legitimate person's voice sample. In an embodiment, the basic process for generating an authentication score comprises performing an acoustic analysis of the voice file to produce a sequence of acoustic vectors representing the relevant voice characteristics for statistical analysis and comparison. Statistical pattern matching algorithms operating in the authentication engine compare the sequence of acoustic vectors with the voiceprint of the legitimate customer to generate a probability score representing how well the voice signal matches the legitimate voiceprint (i.e. an indication of the likelihood that the customer providing both samples is one and the same). Such pattern matching algorithms may include dynamic time warping (DTW), the hidden Markov model (HMM), among others. Further, the algorithms operating in the authentication engine also compare the acoustic vector sequence with the World Model to provide a reference score against which to calibrate the probability scores generated by the user voiceprint. The resultant calibrated probability scores thus provides a measure of how well the impostor voice files matched against the legitimate customer's voiceprint. These measures can thus be used to generate a False Accept characteristics for that customer's vocieprint and can be used to compute the false accept rate for that speaker which is hereafter referred to as the individual false acceptance rate (IFAR).

The next step, step 408, in deriving the measure of confidence involves establishing the false rejection rate associated with the voiceprint (hereafter the individual false rejection rate, or "IFRR"). According to the embodiment described herein, the IFRR is determined by testing the voiceprint with other voice samples of the same content type which have been provided by the legitimate speaker (e.g. either other enrolled samples, or samples which have subsequently been provided during authentication session). An interpolation algorithm is used to smooth the IFRR characteristic where only a few voice samples or voice files are available for determining the IFRR. Alternatively, the FRR for the authentication system as a whole can also be used for the IFRR where there are too few samples to produce an accurate IFFR. Also, at step 408, the overall system EER is established and recorded, for reasons which will become apparent in subsequent paragraphs.

At step 410, the IFAR and IFRR score are processed to determine the individual EER (hereafter "IEER") for the voiceprint. The IEER is determined where the IFAR and IFRR characteristics intersect, (i.e. where the IFRR=IFAR). The IEER, in turn, can be utilised to derive a measure of confidence in the performance of the selected voiceprint, as will be described in subsequent paragraphs.

In an embodiment, the measure of confidence is based, at least in part, on the relationship between the IEER and some reference, such as the average system EER (i.e. the statistical mean of all IEER scores evaluated and recorded by the authentication system). See step 412. In another embodiment, the IEER may be compared against the median EER, the mode of the EER, or some other statistical EER average value which provides a meaningful reference point for establishing the confidence measure. In a specific embodiment, either a weak or strong measure will be attributed to the voiceprint, based on the relationship between the IEER for that voiceprint the mean EER for the system as a whole. In an embodiment, a strong voiceprint is associated with a voiceprint which has a lower IEER than the mean; whereas a weak measure is attribute to a voiceprint having a higher IEER than the mean. The actual deviation between the IEER and mean EER may further be used to evaluate and record the relative strength or weakness of the voiceprint.

Optimisation Actions

Once the IEER score and confidence measure have been derived for the selected voiceprints, a number of different optimisation actions can be carried out by the authentication system 100 to improve the performance of the enrolled voiceprints and thus the performance of the authentication system as a whole.

One such optimisation action involves assigning appropriate individual speaker thresholds for each customer, based on the derived measure of confidence. By assigning appropriate individual thresholds, the percentage of false acceptances and false rejections can be controlled at a customer (per speaker) level, resulting in improved individual customer security and usability. For example, where an individual voiceprint is deemed to be strong, the threshold setting for that voiceprint can be set high, thus increasing the security level for the associated customer without affecting the performance of the system. Conversely, where an individual voiceprint is deemed by the system to be weak, then the threshold for acceptance can be set lower, thereby reducing the probability of the customer being falsely rejected by the authentication system 100.

FIG. 7 shows a screen shot of the graphical user interface which shows different threshold settings derived by the third party system (104) for a number of different speakers (identified by their "ID") for speech items having different Content Types. In this embodiment, the system has computed two threshold settings (upper and lower) which are used by the application to enhance the user interaction with the system. In this example, Threshold 1 for speaker identity 460005 has an upper threshold setting of 49.49 for speaker item 1, compared to 61.56 for speaker identity 460001.

In addition, since the system 100 has recognised that a voiceprint is weak (which in this case equates to EER which is above a particular percentage, e.g. 5%), additional security measures can be put in place to improve the level of security surrounding that voiceprint. For example, a business rule may be assigned to that customer requiring that a further piece of identification information be provided in the authentication session in order to verify the customer's identity being granted access to the secure service. Alternatively, the system may automatically pass the call to an operator to carry out further authentication checks on the customer.

Furthermore, where the third party system 104 establishes that a selected voiceprint is too weak to provide a suitable authentication result (e.g. by comparing the amount of deviation from the mean to a set threshold), the customer may be asked to re-enrol their voice sample.

Figure 5:
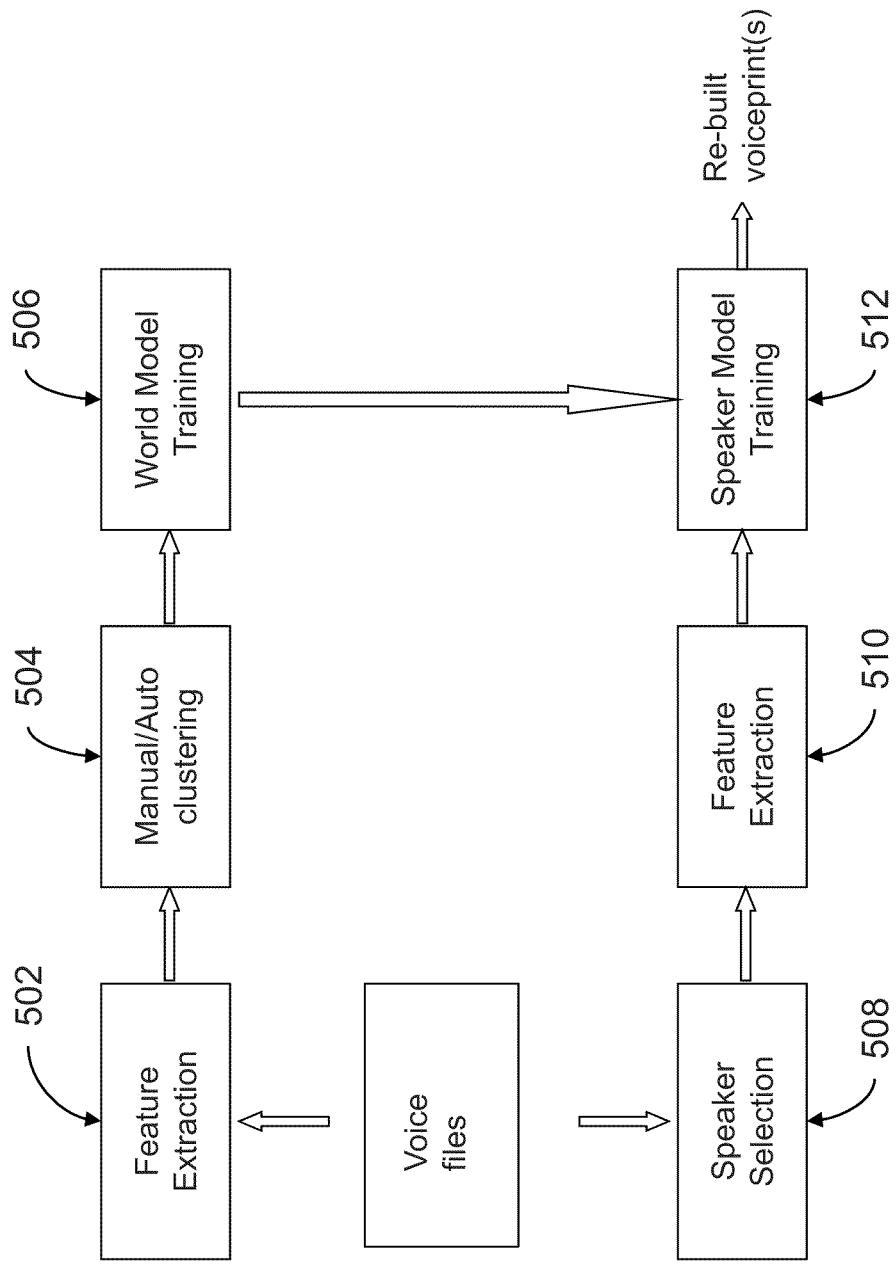
FIG. 5 is a schematic illustrating the system components utilised in re-building world and speaker models.
Figure 6:
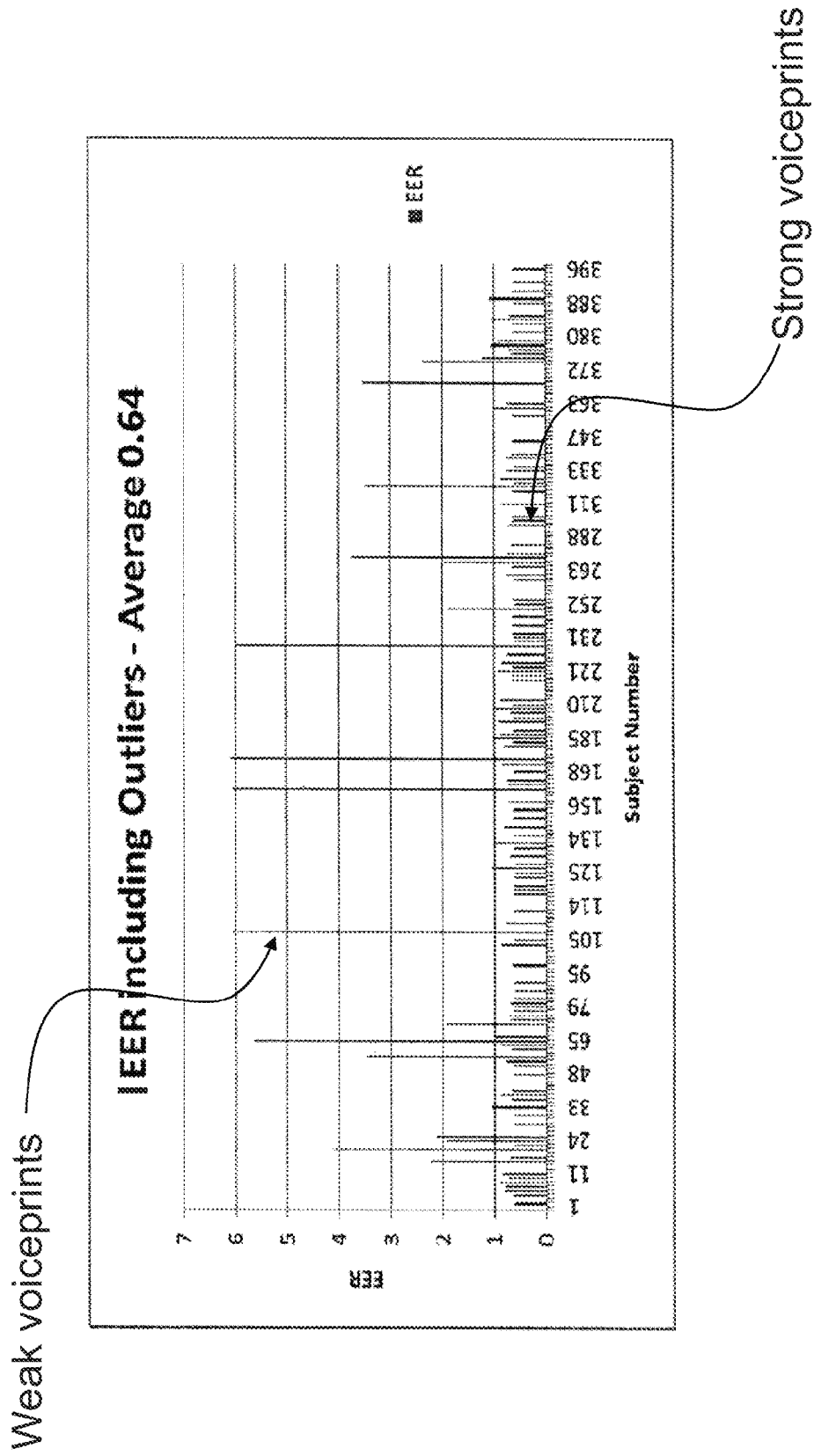
FIG. 6 is a screen shot generated by a graphics rendering application, in accordance with an embodiment.

In another embodiment, upon detecting a sufficiently weak voiceprint, the speaker model for that voiceprint may be re-built to improve the measure of confidence. With reference to the schematic of FIG. 1b and flow chart of FIG. 5, the process of re-building the speaker model will now be described. It will be understood that the various functions performed by the process are carried out by the performance and optimisation module 114 implemented by the third party system 104.

The process first involves re-building the world models (step 502). In an embodiment, this process involves selecting all voice files from the voice file database 109 and performing feature extraction on those voice files. Feature extraction involves applying an acoustic signal processing algorithm to extract the acoustic features of the voice file.

The extracted features are subsequently clustered into one or more groups (step 504), where each group shares one or more common features. For example, groups may be formed from according to speaker gender, input class (e.g. landline originating, mobile phone originating), etc. The grouping can be carried out either manually by selecting voice files that are known to share a common feature (e.g. by inspecting data provided by the customer during enrolment), or automatically using a clustering algorithm that groups all voice files which share common acoustic features.

At step 506, a model is built for each group, using techniques known to persons skilled in the art.

At the same time steps 502 to 506 are being carried out, a speaker selection process extracts the voice files associated with the weak voiceprint from the voice file database 109, performs a feature extraction on the extracted voice files and presents the features to a speaker model training process (steps 508 to 512). The speaker model training process uses the parameters created during the world model creation process (step 506) as seed parameters which are then re-estimated using the relevant extracted feature(s), to re-build the voiceprint. Where more than one world model has been created at step 506, the world model having parameters which are closest to the relevant extracted parameters is used. The re-built model is then stored in the voiceprint database 109 in place of the weak voiceprint.

Figure 8:
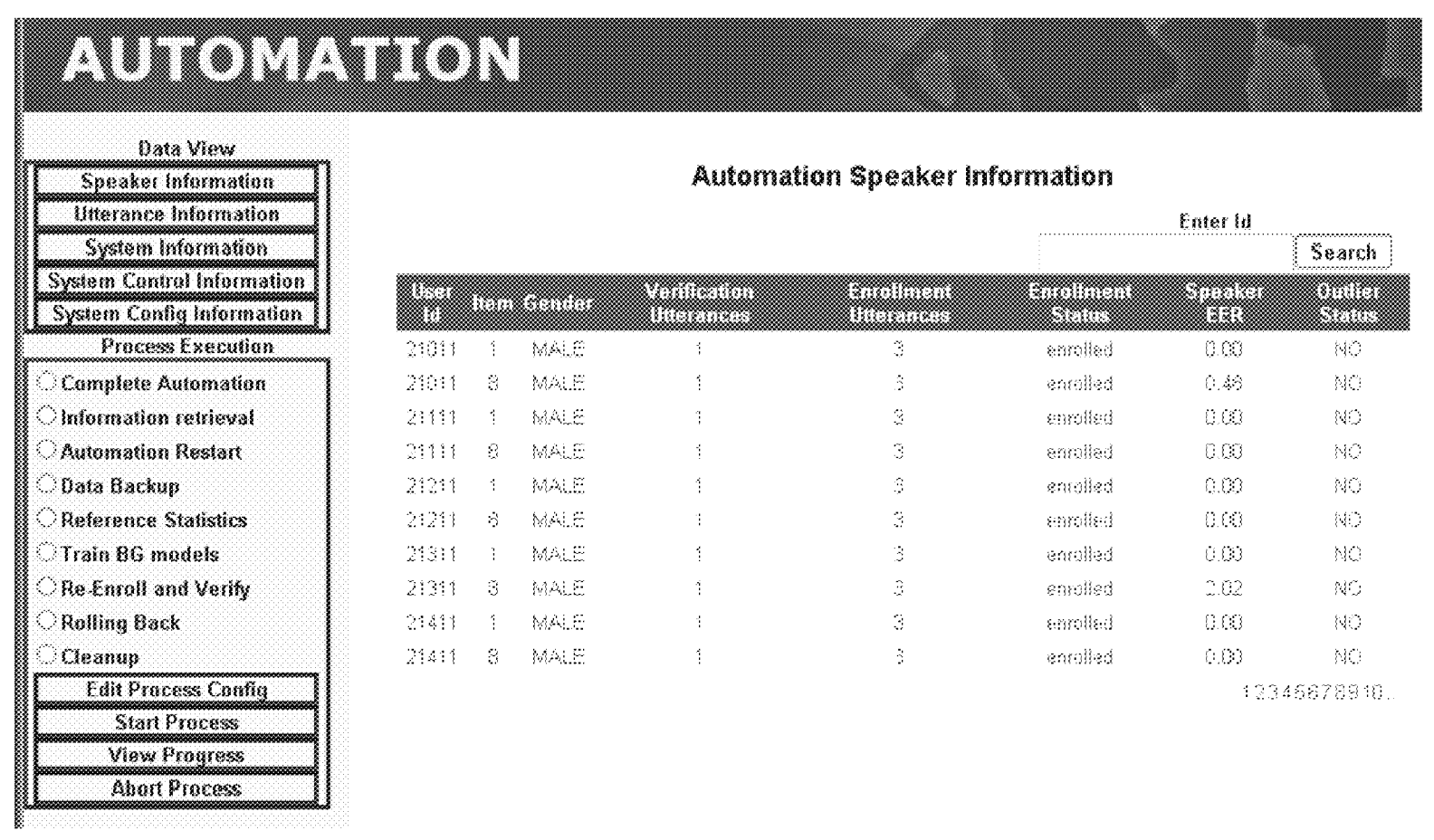

FIGS. 8, 9, 10, 11 and 12 show example screen shots of the system performing these steps. FIG. 8 is a screen shot showing information derived by the system about speakers' voiceprints enrolled in the system and the IEER score for each speaker voiceprint derived using the testing method described herein.

Figure 9:
FIGS. 9 and 10 are screen shots in accordance with further embodiments of the present invention.

FIG. 9 shows a screen show of the system identifying weak voiceprints as determined by the process which, in this embodiment, are highlighted in brown. In this case voiceprints with IEER scores greater than 5% are considered weak and are therefore selected for optimisation as per any of the optimisation process described herein.

Figure 10:
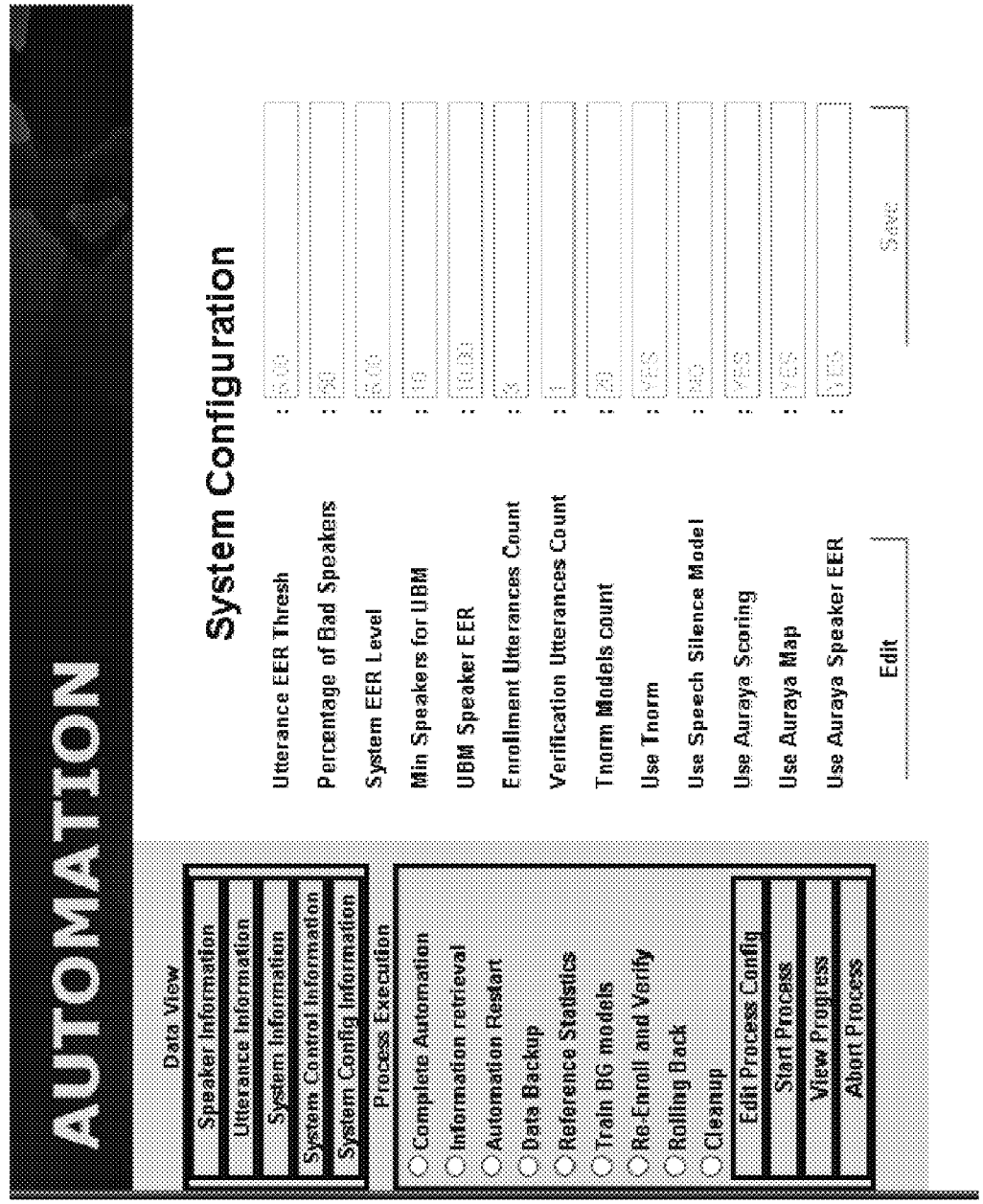
Figure 11:
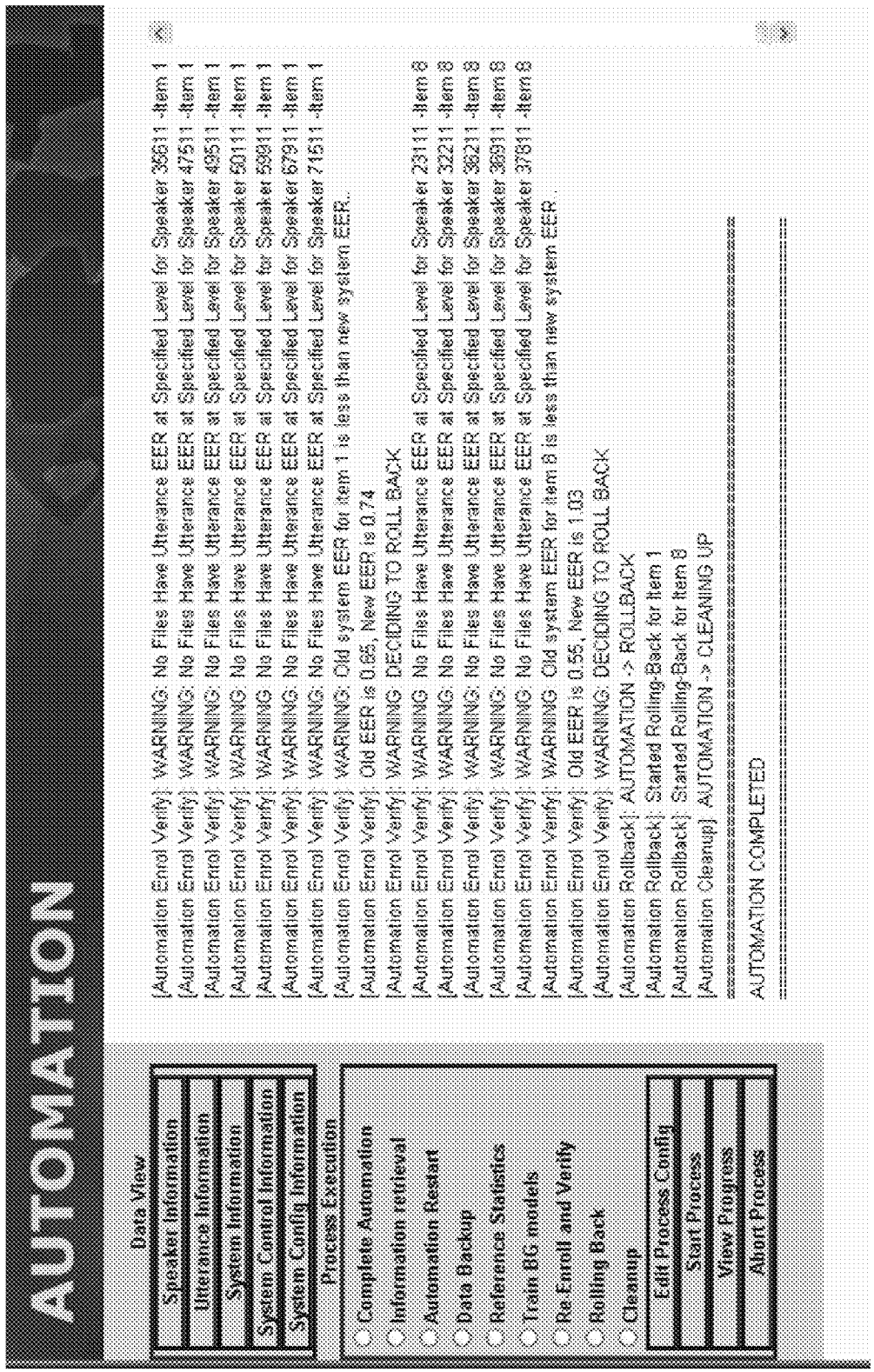
FIG. 11 is a screen shot generated by a graphics rendering application, in accordance with an embodiment showing the optimisation process in action and reporting optimisation results.
Figure 12:
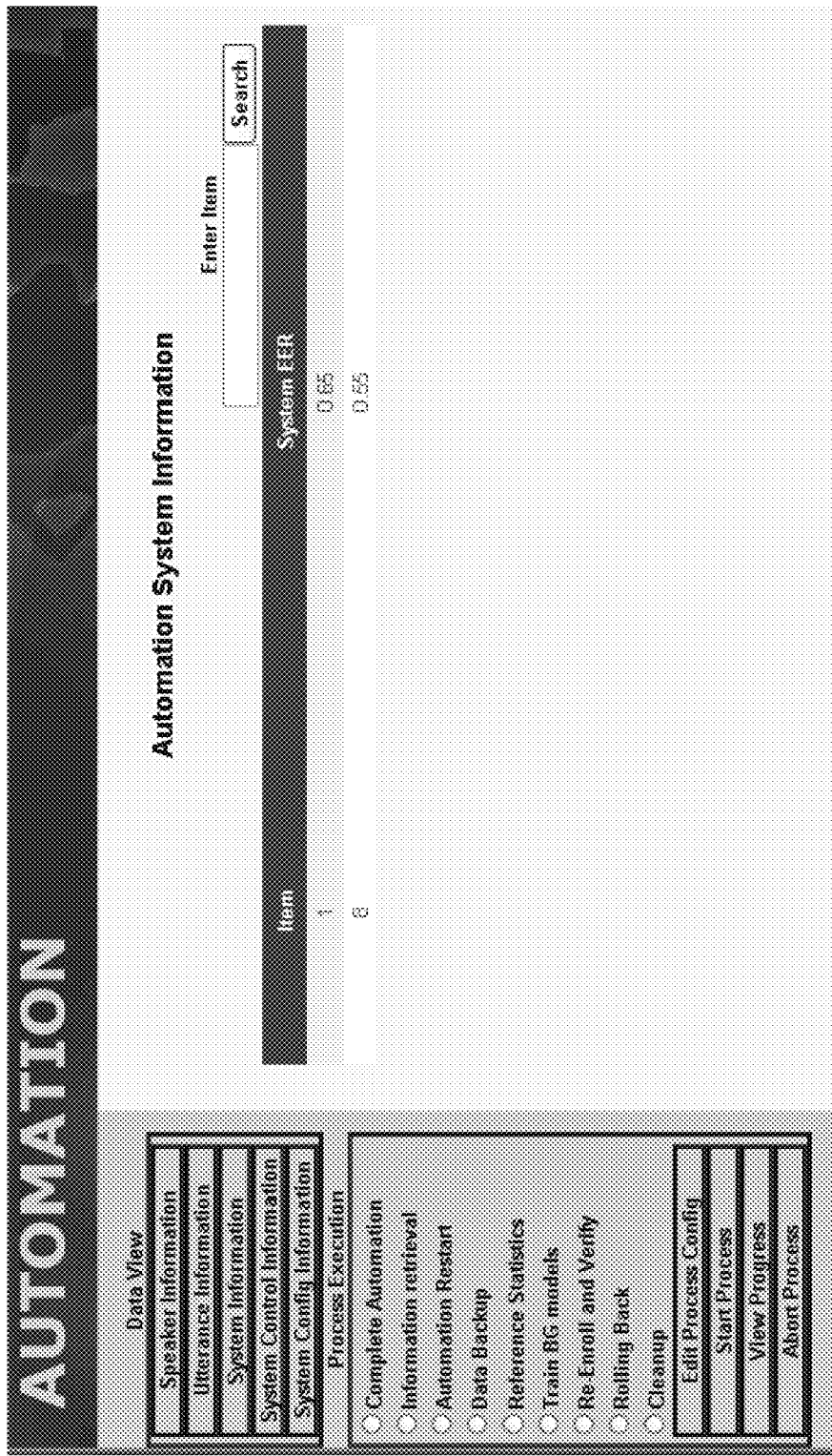
FIG. 12 is a screen shot generated by a graphics rendering application, in accordance with an embodiment showing the Equal Error rate (EER) for the overall system after the optimisation process for speech samples with Content Type 1 (spoken account numbers) and Content Type 8 (a spoken phrase).

FIG. 10 shows a screen shot of the system configuration consol which is operable to set the parameters for selection of voiceprints for optimisation. FIG. 11 shows the screen shot of the optimisation process as reported by the system and the completion of the optimisation procedure. FIG. 12 shows the EER performance of the overall system once the optimisation procedure has completed. In this case the EER performance for the overall system is 0.65% for speech item 1 (i.e. spoken account numbers) and 0.55% for speech item 8 (which are spoken phrases). This compares to an EER of 2-3% prior to the optimisation process.

It will be understood that any one or more of the above optimisation actions can be carried out each time a new voice sample is enrolled with the system, or alternatively can be carried out on an ongoing basis until a performance threshold for the authentication system 104 has been met. In an embodiment, the performance of the third party system 104 may be measured by inspecting the overall EER score of the system.

System Configuration

A more detailed explanation of the various modules implemented by the third party system 104 will now be described with reference to FIG. 1b.

As mentioned in preceding paragraphs, the third party system 104 comprises a server 105 which functions not only to authenticate customers of the secure service, but in addition to determine measures of confidence for each enrolled voice sample (and, in embodiments, the overall system) and carry out appropriate optimisation actions. To perform this functionality, the server 105 comprises computer hardware including a processor, motherboard, random access memory, hard disk and a power supply. The server 105 also includes an operating system which co-operates with the hardware to provide an environment in which software applications can be executed. In this regard, the hard disk of the server 105 is loaded with voice authentication software, such as the Auraya voice authentication module which is available from Auraya Systems Pty Ltd, Australia. The hard disk is also loaded with an impostor testing module 116 which operates in conjunction with the voice authentication software to carry out the simulated impostor attacks, as herein before described. A performance evaluation and optimisation module 114 is also provided for calculating the confidence measures and implementing the various optimisation actions previously described. A graphics rendering application is also provided for displaying the results of the impostor testing and various confidence measures for each tested voice sample. An example screen shot generated by the graphics rendering application showing the IEERs for each enrolled voice file is illustrated in FIGS. 6, 7, 8, 9, 10, 11 and 12.

The server 105 is also coupled to a voice file database 107, voiceprint database 109, identity management database 111 and confidence measure database 113. The hard disk of the server 105 also includes appropriate software and hardware for communicating with the secure service provider system 106. The communication may be made over any suitable communications link, such as an Internet connection, a wireless data connection or public network connection. In an embodiment, the voice samples provided for enrolment and authentication are initially logged with the secure service provider 106 and subsequently passed over the communications link to the third party system 104. Alternatively, the samples may be provided directly to the server 105 (in which case the server 105 would also implement a suitable call answering service).

The customer input device is a standard telephone including a transceiver and suitable for use with a public-switched telephone network.

As discussed, the communication system 108 is in the form of a public switched telephone network. However, in alternative embodiments the communications network may be a packet-switched network, such as the Internet. In such an embodiment customers may use a networked computing device to exchange data (more particularly, XML code and packetised voice messages) with the server 105 using a packet-switched network protocol, such as the TCP/IP protocol. Further details of such an embodiment are outlined in the international patent application PCT/AU2008/000070, the contents of which are incorporated herein by reference. In another alternative embodiment, the communication system may additionally comprise a third generation ("3G") or GPRS enabled mobile telephone network connected to the packet-switched network which can be utilised to access the server 105. In such an embodiment, the customer input device 102 would include wireless capabilities for transmitting the voice message. The wireless computing devices may include, for example, mobile phones, personal computers having wireless cards and any other mobile communication device which facilitates voice recordal functionality. In another embodiment, the present invention may employ an 802.11 based wireless network or some other personal virtual network.

The other element in the system 100 is the secure service provider system 106 which, according to the embodiment described herein, is in the form of an Internet banking server. The secure service provider system 106 comprises a transceiver in the form of a network card for communicating with both the customers and third party system 104. The server also includes appropriate hardware and/or software for providing an answering service. In the illustrated embodiment, the secure service provider 106 communicates with the customers 102 over a public-switched telephone network 108 utilising the transceiver module.

The secure service provider system 106 may also include an ascertaining module for ascertaining measures of confidence from the third party system and an adjustment module which either adjusts the threshold settings within the secure service provider system 106 or instructs the third party system 104 of the appropriate settings for each type of transaction, dependent on the determined measure of confidence.

Although in embodiments described in preceding paragraphs the authentication system 104 was in the form of a "third party", or centralised system, it will be understood that the system need not be a third party system but instead may be incorporated into the secure service provider system.

Furthermore, it will be understood that any suitable measure of confidence may be associated with the individual voice samples/voiceprints and need not be limited to the embodiment described herein. It will also be understood that the measure of confidence may be derived through mechanisms other than simulated impostor testing. For example, the individual scores utilised in deriving the measure may be ascertained through normal (i.e. not simulated) operation of the authentication system.

While the invention has been described with reference to the present embodiment, it will be understood by those skilled in the art that alterations, changes and improvements may be made and equivalents may be substituted for the elements thereof and steps thereof without departing from the scope of the invention. In addition, many modifications may be made to adapt the invention to a particular situation or material to the teachings of the invention without departing from the central scope thereof. Such alterations, changes, modifications and improvements, though not expressly described above, are nevertheless intended and implied to be within the scope and spirit of the invention. Therefore, it is intended that the invention not be limited to the particular embodiment described herein and will include all embodiments falling within the scope of the independent claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method for configuring a voice authentication system, the method comprising the steps of:
selecting a voiceprint stored by the voice authentication system, the voiceprint being associated with a person enrolled with the voice authentication system;
initiating an impostor testing process comprising comparing the voiceprint against a plurality of impostor voice samples associated with at least one other person, to generate a corresponding number of authentication scores;
evaluating the authentication scores to derive a confidence score associated with a susceptibility parameter for the voiceprint; and
in response to determining that the confidence score does not meet a predefined confidence threshold, implementing an optimisation action comprising adjusting at least one of a security parameter and voiceprint parameter associated with the enrolled person.

2. A method in accordance with claim 1, wherein the impostor voice samples are provided by the at least one other person during enrolment with the system or during a subsequent successful authentication session.

3. A method in accordance with claim 1, wherein the parameter is associated with a rate at which the impostor voice samples are incorrectly evaluated by the voice authentication system as being associated with the enrolled person.

4. A method in accordance with claim 3, wherein the parameter is further associated with a rate at which the at least one voice sample is incorrectly evaluated by the voice authentication system as not being associated with the enrolled person.

5. A method in accordance with claim 4, wherein the individual false acceptance rate and individual false rejection rate are utilised to determine an individual equal error rate (IEER) for the voiceprint, the confidence score being a measure of the IEER.

6. A method in accordance with claim 5, wherein the threshold is one of a mean individual equal error rate for a plurality of voiceprints of other speakers enrolled with the system, or an average equal error rate for the authentication system.

7. A method in accordance with claim 6, wherein the optimisation action is implemented where the confidence score meets or exceeds the mean IEER or average system EER.

8. A method in accordance with claim 1, wherein the optimisation action comprises re-building the voiceprint to adjust model parameters associated with the voiceprint.

9. A method in accordance with claim 1, wherein the optimisation action comprises re-building a world model from which the associated voiceprint was derived.

10. A method in accordance with claim 1, wherein the optimisation action comprises adjusting an authentication threshold associated with the voiceprint, based on the confidence score.

11. A method in accordance with claim 1, wherein the optimisation action comprises obtaining a further voice sample from the enrolled person and re-building the voiceprint based on the further voice sample.

12. A method in accordance with claim 1, further comprising repeating the configuration process for each voiceprint enrolled with the system.

13. A method in accordance with claim 1, further comprising repeating the configuration process for additional voiceprints enrolled with the system until a threshold performance measure for the system has been met.

14. A method in accordance with claim 13, wherein the performance measure is associated with an overall equal error rate for the system.

15. A method in accordance with claim 1, wherein the impostor samples have the same content type and/or speaker characteristic as the enrolled voiceprint.

16. A non-transitory computer readable medium providing a computer program comprising at least one instruction for controlling a computer system to implement a method in accordance with claim 1.

17. A voice authentication system comprising:
a database adapted to store a voiceprint associated with a person enrolled with the system;
an authentication module arranged to select and compare the voiceprint against a plurality of impostor voice samples associated with at least one other person, to generate a corresponding number of authentication scores; and
a performance evaluation module operable to evaluate the authentication scores to derive a confidence score associated with a susceptibility parameter for voiceprint; and
an optimisation module operable to implement an optimisation action for the voiceprint in response to determining that the confidence score does not meet a predefined confidence threshold, the optimisation action comprising adjusting at least one of a security parameter and voiceprint parameter associated with the enrolled person.

18. A system in accordance with claim 17, wherein the susceptibility parameter is associated with a rate at which the impostor voice samples are incorrectly determined by the voice authentication system as being associated with the enrolled person.

19. A system in accordance with claim 18, wherein the authentication module is further arranged to compare at least one voice sample provided by the enrolled person against the voiceprint and wherein the susceptibility parameter is additionally associated with a rate at which the at least one voice sample is determined by the voice authentication system as not being associated with the enrolled person.

20. A system in accordance with claim 19, wherein the individual false acceptance rate and individual false rejection rate are utilised to determine an individual equal error rate (IEER) for the voiceprint, the confidence score being a measure of the IEER.

21. A system in accordance with claim 20, wherein the threshold is one of a mean individual equal error rate for a plurality of other voiceprints enrolled with the system and an overall equal error rate for the authentication system.

22. A system in accordance with claim 17, wherein the optimisation action comprises re-building the voiceprint to adjust model parameters of the voiceprint.

23. A system in accordance with claim 17, wherein the optimisation action comprises re-building a world model from which the associated voiceprint was derived.

24. A system in accordance with claim 17, wherein the optimisation action comprises adjusting an authentication threshold for the enrolled person.

25. A system in accordance with claim 17, wherein the optimisation action comprises obtaining at least one further voice sample provided by the enrolled person and regenerating the voiceprint based on the at least one further voice sample.

26. A system in accordance with claim 17, wherein the impostor voice sample are provided by the at least one other person during enrolment with the system or during a subsequent successful authentication session.

\* \* \* \* \*